Feb. 20, 1934. L. EISELE 1,947,643
RESILIENT WHEEL FOR MOTOR VEHICLES OF ALL KINDS
Filed Sept. 21, 1931
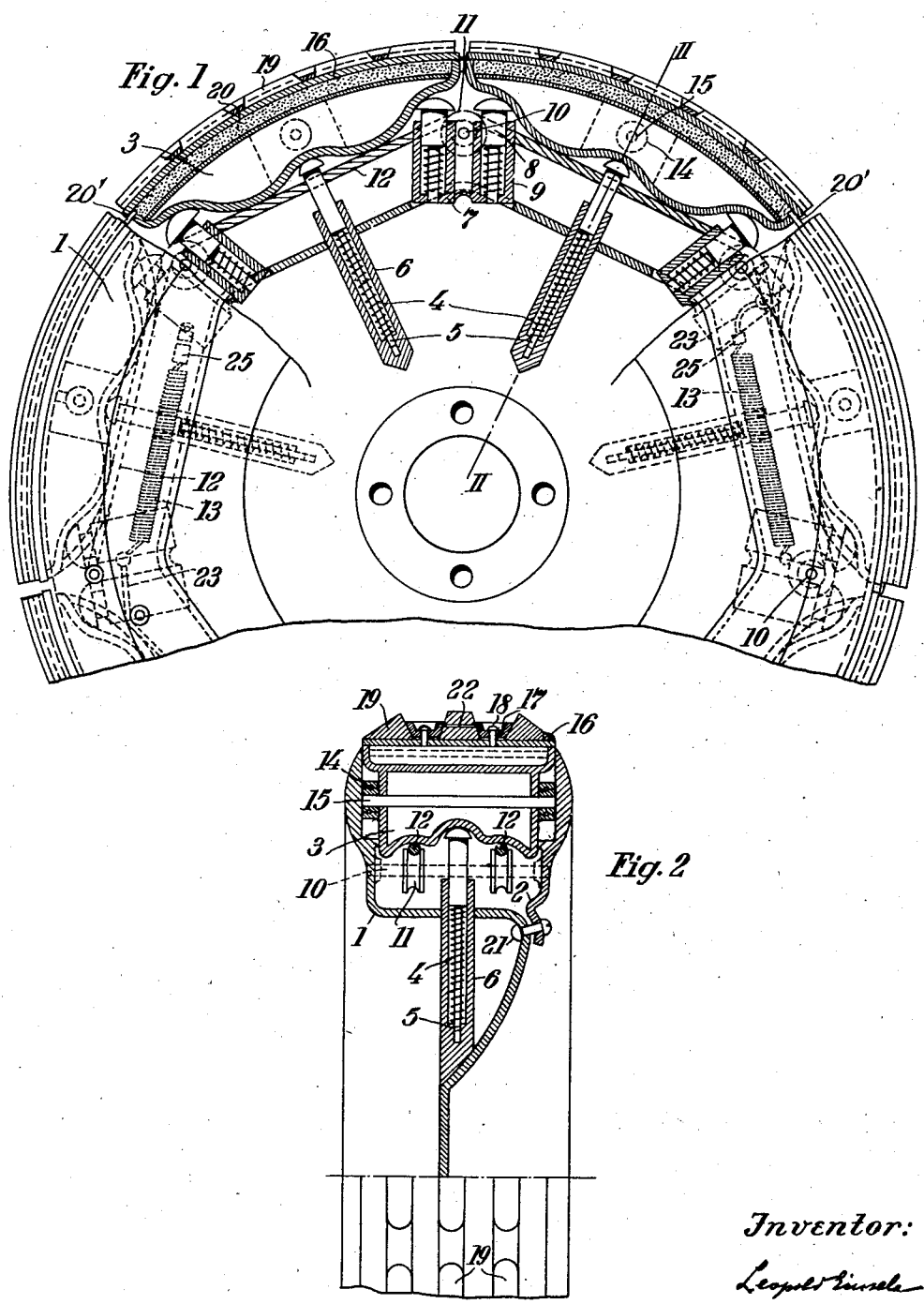
Inventor:
Leopold Eisele Patented Feb. 20, 1934

1,947,643

UNITED STATES PATENT OFFICE 1,947,643

RESILIENT WHEEL FOR MOTOR VEHICLES OF ALL KINDS

Leopold Eisele, Saarbrucken, Germany

Application September 21, 1931, Serial No. 564,107, and in Germany October 13, 1930

2 Claims. (Cl. 152—30)

Many constructions are already known, which have for their object to replace the generally used rubber pneumatic cushioning by mechanical resilient elements on the wheels of motor vehicles. All experiments made in this direction have not hitherto resulted in an extensive use of such substitute devices. The reasons for the inefficiency of the known devices consist chiefly in that an undivided outer rigid wheel tire is connected to the wheel hub or to the wheel spokes by springs, which produce a resilient effect. This resilient effect was however not perfect, as this was obtained by radial shifting of the entire outer tire and the shifting effect in the driving wheels very considerably stressed the material.

As compared therewith the resilient wheel construction according to the invention acts in a similar manner to an inflated tube in which a compression of the outer tire circumference occurs at the point of contact with the ground owing to the subdivision of the spring elements placed around the circumference of the wheel.

An embodiment of the invention is illustrated by way of example in the accompanying drawing in which:

Fig. 1 shows the wheel in side elevation, partly in section.

Fig. 2 is an end elevation with a part cross section on line II—II of Fig. 1.

The resilient wheel for motor vehicles consists of a sheet steel main rim 1 and of an auxiliary rim 2 united by screws 21, carrying independently arranged segment shaped elements 3, hereinafter referred to as cases. In the outer radius space the cases are lined with layers of impregnated felt or similar material. The set of felt layers 20 is covered on the outer side by a sheet 16 of non-rusting material. This sheet 16 serves at the same time as support for rubber strips 19, which may be arranged in different manners. A cover sheet 17 is stamped out to correspond to the shape of the gap between the strips 19 and form the holder for same, the cover sheet 17, the under sheet 16 and felt layers 20 being fixed by screws 18 to the bottom of the case. A further securing of the strips 19 is effected by small pins 22. Each case is rotatably and radially shiftably mounted in the main and auxiliary rim and oscillatable on a case bolt 15. The bearing points of the case bolts are provided with ball bearings 14. The individual case parts are connected the one with the other by closing felt strips 20' to prevent the penetration of dirt between the cases. The inner case bottom is provided with grooves in the running direction of the wheel. The case rests with these grooves on wire ropes 12, which extend over pulleys 11 mounted on transverse axles 10 in the cases, are fixed on one or both sides to hooks 23 and springs 13, and hold the box in resilient position. The resiliency of the wire rope is ensured by the pull springs 13 connected at one or both ends to a hook. For readjusting the resilient rope adjusting bolts 25 are provided. A long spring bolt 4, 5 and 6 is arranged in the middle of each case as a further resilient element, besides two shorter bolts 7, 8 and 9 so arranged, that in the case of strong depression of the case the pressure is taken up according to its position.

The resilient wheel operates in the following manner.

Owing to the cases being arranged around the circumference of the wheel, the changes in the outer wheel tire owing to a load is always, as in the case of pneumatic tires, merely limited to a small portion of the circumference. Moreover, the running of the wheel from a loaded case on to an unloaded case occurs with complete stressing of the running off case, whereas the running on case is partly relieved according to its position relative to that point of the bottom surface situated vertically above the centre of the axis. This capacity of the wheel, together with the subdividing of the cushioning operation in the wheel proper, produces a particularly soft cushioning free from vibrations. Especially the oscillating movement of the case around the axially shiftable case bolt centre allows the occurring pressures to act in absolutely axial direction, so that a lateral pressure moment cannot occur on the resilient parts in the case of the driven wheels. The cushioning operations are subdivided in such a manner that the pressure is taken up by the resilient wire ropes and, in the event of increasing pressures, the cushionings 4, 5, 6 or 7, 8, 9 entering into function according to the position of the individual cases.

These different cushionings act amongst themselves also as safety means in the event of the one or other cushioning becoming defective.

I claim:

1. A resilient wheel for motor vehicles of all kinds, comprising in combination with the wheel body, having a main rim, an auxiliary rim bolted on said main rim, a plurality of independent shiftable case elements mounted between said main rim and said auxiliary rim, a central bolt and two end bolts resiliently mounted in said main rim adapted to support each of said cases, a transverse bolt projecting from each side of each of said cases, ball bearings one on each end of each of said case bolts adapted to radially guide said cases between said main rim and auxiliary rim and to allow said cases to oscillate, pulleys between said main rim and said auxiliary rim distributed around the circumference of the wheel, and wire ropes arranged over said pulleys engaging in the underside of said cases adapted to coact with said resiliently mounted bolts to support and cushion said cases.

2. A resilient wheel as specified in claim 1, in which for each case the two end bolts are arranged symmetrically inclined to the axis of the central bolt at equal distances from the transverse case bolt to cushion said case during its oscillating movement.

LEOPOLD EISELE.